UNITED STATES PATENT OFFICE 2,251,566

DYESTUFF OF THE ANTHRAQUINONE SERIES

Donald P. Graham, Wilmington, Del., assignor to E. I. du Pont de Nemours & Company, Wilmington, Del., a corporation of Delaware No Drawing. Application January 24, 1941, Serial No. 375,803

1 Claim. (Cl. 260—274)

This invention relates to the preparation of new dyestuffs of the anthraquinone series, and has for its object the preparation of new dyes of the benzanthronyl-aminoanthraquinone acridine series which dye cotton from the usual alkaline hydrosulfite vat in greenish-olive shades of excellent fastness properties.

In U. S. P. 995,936 a dyestuff is disclosed which is produced by the alkaline fusion of the condensation product of Bz-1-benzanthrone with 1-aminoanthraquinone. This product is said to dye cotton in fast green shades. Numerous patents have issued subsequent to this patent in which various substituents have been introduced in either the anthraquinone or the benzanthrone nucleus. These products all contain, when ring-closed, what is generally considered to be an acridine ring and in all cases there is only one acridine ring attached to the central benzanthrone nucleus.

I have found that new and very valuable dyes may be produced which dye cotton in desirable greenish-olive shades of excellent fastness when an alpha-chloro-Bz-1-bromo-benzanthrone is condensed first in equal molecular parts with an alpha aminoanthraquinone compound and the resulting product then condensed with Bz-1-aminobenzanthrone. On fusion of the resulting di-condensation product with caustic alkalies in the manner usually employed in fusing benzanthronylaminoanthraquinones a product is produced which would appear to be a diacridine compound in which the acridine rings are both attached to the central benzanthrone nucleus.

In the preparation of dihalogen benzanthrones by direct halogenation of the benzanthrone molecule the first halogen is introduced in the Bz-1-position while the second halogen enters the 6-position in the main, with some entering the 7-position. On the condensation of the 6-Bz-1-dihalogenbenzanthrone first with 1-amino-anthraquinone and then with Bz-1-aminobenzanthrone a beta linkage is obtained which has been found on fusion to give dyestuffs of different shade than those obtained where the benzanthronyl-amino group is linked to the benzanthrone molecule in an alpha-position.

I have found that if the normally occurring isomeric mixture of alpha-chlorobenzanthrones (which is produced by the condensation of 1-chloro-anthraquinone with acrolein in sulfuric acid by the usual methods) is brominated with one molecule of bromine an alpha-chloro-Bz-1-bromobenzanthrone is obtained which on condensation with 1 mole of aminoanthraquinone and 1 mole of Bz-1-aminobenzanthrone gives a product which on fusing with caustic alkalies dyes cotton in exceptionally fast shades of greenish-olive, and exhibits good dyeing properties.

While it is generally concluded that the isomeric mixture of alpha-chlorobenzanthrones prepared from 1-chloroanthraquinone is composed in the main of the 5-chloro derivative it is recognized that isomeric products such as the 8-chloro and probably to a lesser extent some of the 4-chlorobenzanthrone are present. The dyestuff produced according to this invention is therefore undoubtedly a mixture of the products obtained from the 3-isomeric chlorobenzanthrones. In the alkaline fusion of the dicondensation product it is believed that two acridine rings are formed although such a formula cannot definitely be proved, and I do not intend to limit this invention by any particular theoretical formula that might be drawn. For the purposes of general description the following formula may be considered as representing the type of products that are formed by the alkaline fusion of the benzanthronyl-amino-anthraquinonylamino-benzanthrone.

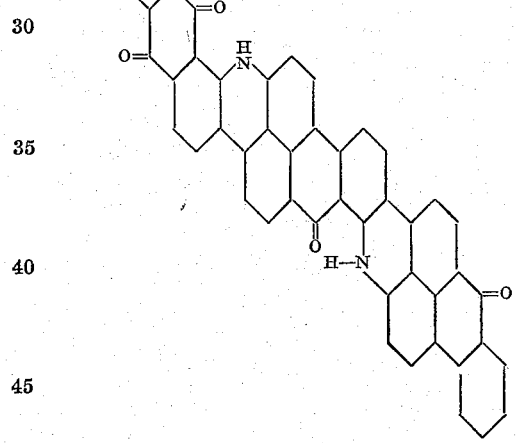

The following example is given to illustrate the invention. The parts used are by weight.

Example 1

1-chloroanthraquinone is condensed with acrolein in sulfuric acid (in the usual manner) to give a mixture of isomeric alpha-chlorobenzanthrones. This mixture is brominated in nitrobenzene with bromine and sulfuryl chloride, one bromine atom being introduced to give a mixture of isomers that may be referred to as "alpha-chloro-Bz-1-bromobenzanthrones."

Thirty-four parts of the above alpha-chloro-Bz-1-bromobenzanthrone, 24 parts of 1-aminoanthraquinone, 25 parts of soda ash, 2.5 parts of copper acetate, and 0.2 part of copper powder are slurried in 560 parts of nitrobenzene and heated to 200–210° for two hours.

Thirty-two parts of Bz-1-aminobenzanthrone are then added followed by 25 parts of soda ash, 2.5 parts of copper acetate and 0.2 part of copper powder. The charge is stirred at 200–210° for 10 to 15 hours, cooled to 50° C., filtered, washed with 50 grams nitrobenzene, followed by alcohol. The cake is extracted with dilute hydrochloric acid, filtered, washed with water and dried. This benzanthronylamino-anthraquinonylamino-benzanthrone is considered as having the formula:

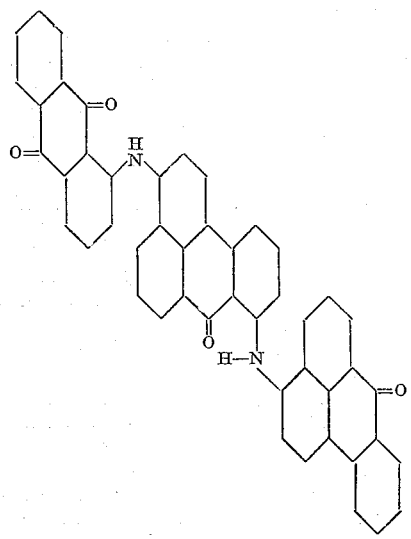

450 parts of alcohol and 450 parts of KOH are heated together to 120° C. (allowing some of the alcohol to distill off) and 65 parts of the benzanthronylamino - anthraquinonylamino - benzanthrone formed above are added. The fused mass is then heated during 2 hours to 165° C. and held at 165–170° C. for one hour under reflux. The mass is then drowned in 5000 parts of cold water, heated to a boil, and stirred at 90–100° C. in contact with the air until precipitation of the crude color is complete. The aerated slurry is filtered. The cake is washed alkali-free and dried.

Sixty parts of the crude color are slurried in 1200 parts of 96% sulfuric acid at 5–6° C., stirred until free from lumps, and drowned in 5000 parts of ice water. The drowned mass is filtered and the cake washed acid-free.

The product is a dark colored paste which dyes cotton in fast green-olive shades from a dark vat.

While in the above example the unsubstituted aminoanthraquinone and Bz - 1 - aminobenzanthrone are employed, it is of course understood that these compounds may carry substituents in positions other than the 2-position of each of the molecules. Where the substituents are not split off during the caustic alkali fusion, substitution derivatives of the dyestuffs above formulated may be produced.

I claim:

The dyestuff, which is substantially identical to that obtained by condensing one mole of an alpha-chloro-Bz-1-bromo-benzanthrone with an alpha-aminoanthraquinone, further condensing one mole of this product with one mole of a Bz-1-aminobenzanthrone, and fusing the di-condensation product with caustic alkali, and which dyes cotton from the usual alkaline hydrosulfite vat in green-olive shades of excellent fastness properties.

DONALD P. GRAHAM.